United States Patent [19] | [11] 4,050,161

Yabashi | [45] Sept. 27, 1977

[54] TRUE NORTH MERIDIAN INDICATOR

[76] Inventor: Tokutaro Yabashi, 265 Akasaka, Ogaki, Gifu, Japan

[21] Appl. No.: 635,308

[22] Filed: Nov. 26, 1975

[51] Int. Cl.[2] ........................ G04B 49/04; G01C 17/34

[52] U.S. Cl. ........................................................ 33/270

[58] Field of Search .................. 33/269, 270, 271, 273

[56] References Cited

U.S. PATENT DOCUMENTS 3,616,538 11/1971 Yabashi .................................. 33/270

*Primary Examiner*—Richard E. Aegerter
*Assistant Examiner*—Richard R. Stearns

[57] ABSTRACT

A meridian indicator comprising a base plate, an inclined plate disposed at a selected angle to the base plate, an hourly graduated arcuate plate, means rotatively supporting the arcuate plate upon the inclined plate, a rectangular style plate, means supporting a first edge of the style plate at a selected angle to the inclined plate, means angularly displacing the style plate at a selected angle relative to a horizontal plane, a weighted string means attached to a second edge of the style plate which is parallel to the first edge, aperatures in the inclined plate and the arcuate plate positioned so that weighted string means adjustably passes therethrough, and a latitude scale means deposed on the inclined plate and juxtapositioned to the weighted string means as it passes through the aperatures, an equation of time correction scale means disposed upon the arcuate plate, and a longitude scale means disposed upon the inclined plate in juxtaposition to the equation of time correction scale means, the arcuate plate having hourly graduations so that when a third edge of the style plate is pointing to true north, the shadow of the sun of the third edge of the style plate falls correctly upon an hourly graduation upon the arcuate plate to read true solar time.

1 Claim, 3 Drawing Figures

TRUE NORTH MERIDIAN INDICATOR

This invention is directed to sun dials and in particular to an improved sun dial which can locate the celestial pole and the true north meridian.

In the fields of navigation and civil engineering, the exposure to sunlight is often important and the direction of sunlight is directly related to the true north meridian.

When an arcuate true north meridian is required, the use of a conventional magnetic compass, even when the exact earth's magnetic field deviation is known, still can lead to large errors because of local steel structures such as reinforced steel buildings, rails for railroads or subways, and steel road viaducts.

Further, the determination of true north for navigation has been important since the beginning of long distant land and sea historical voyages.

An object of the present invention is to provide a new apparatus for the determination of the true north meridian based on the principle of an improved sundial.

A sundial of the horizontal type gives the true solar time only when its style points to the celestial pole. Conversely, the style of the sundial correctly points the celestial pole when the sundial is placed to correctly indicate the true solar time.

The present invention makes use of such principles to provide an improved sundial of the horizontal type having substantially equidistant hourly markings so that the sundial shows exact standard time when a simple correction is made for latitude, longitude and the equation of time. With these improvements, the sundial is effective for the determination of the direction of the true north meridian, provided that it is placed in such a way that the shadow of the style plate correctly indicates the standard time.

Another object of the invention is to provide a true north meridian indicator employing a sundial which has substantially the same accuracy from early morning to late afternoon.

These and other objects of the invention will be apparent from the following description and the appended claims.

Figure 1:
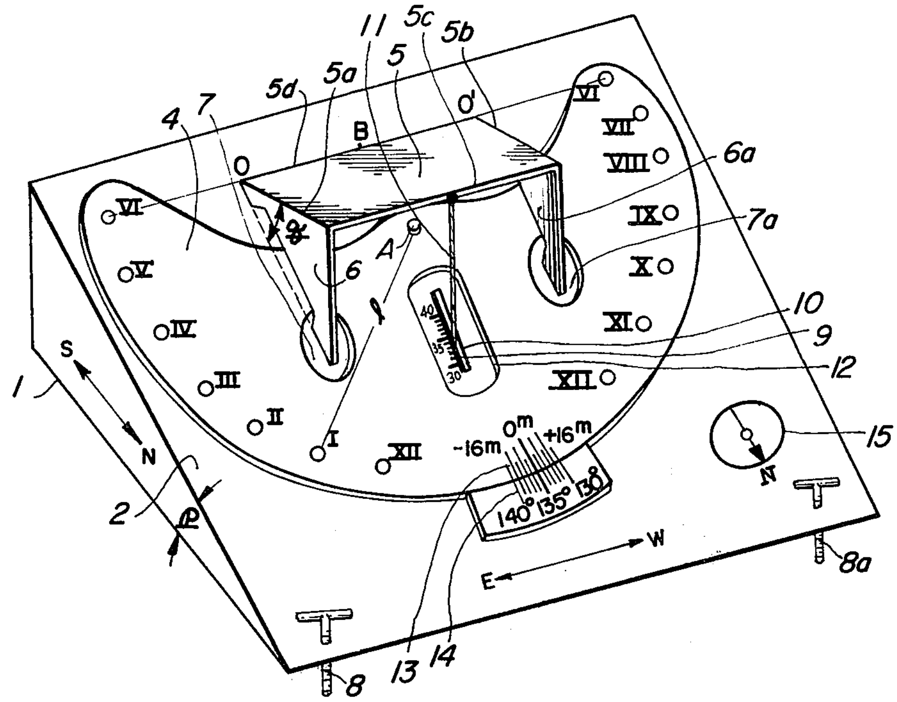
Figure 2:
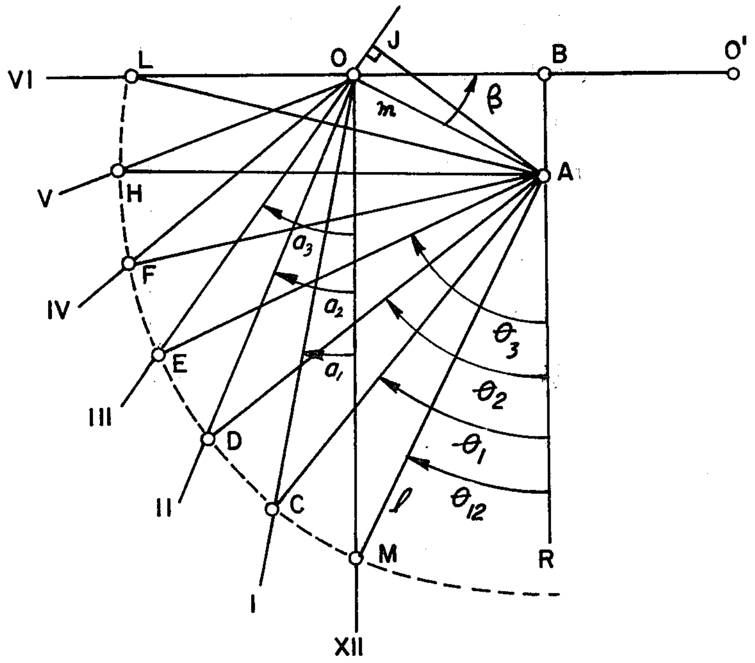
Figure 3:
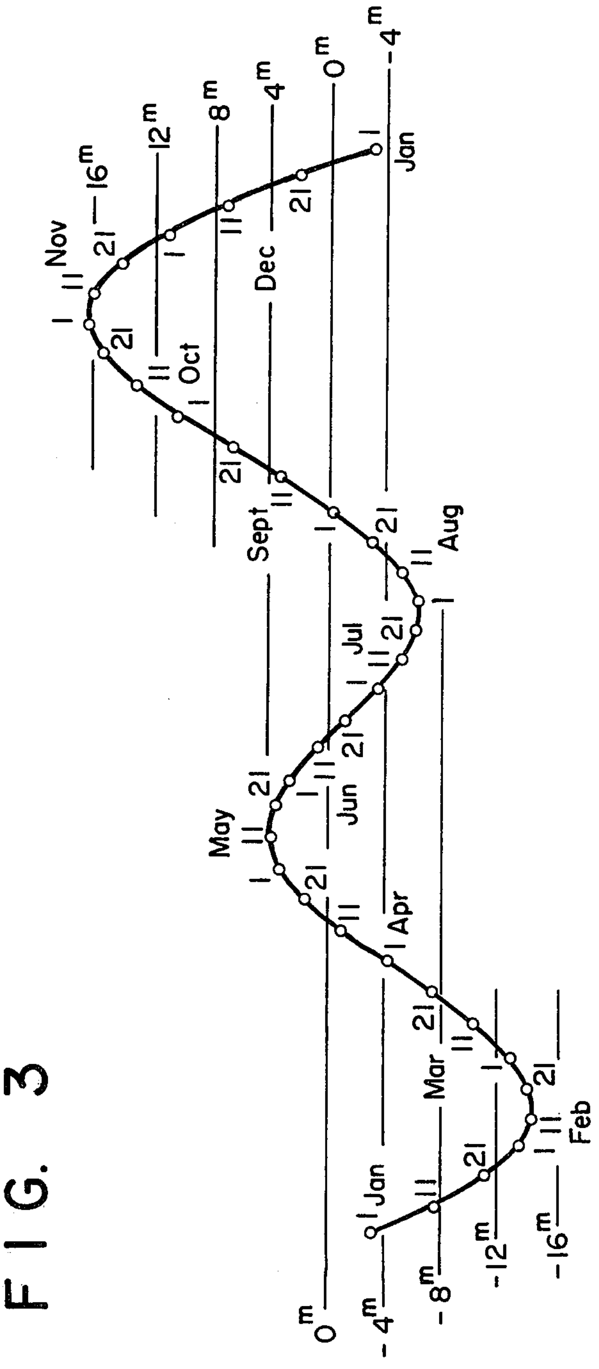

In the description of the invention, reference is made to the accompanying drawings, of which:

FIG. 1. is a perspective view of a true north meridian indicator according to the invention;

FIG. 2 is a diagram showing the method of equidistantly graduating the hour numbers on the sundial of the meridian indicator of FIG. 1; and FIG. 3 is a chart illustrating how to correct the meridian indicator of FIG. 1 according to the daily variation throughout the year of the angle of declination of the sun.

In FIG. 1, a horizontal base plate 1 has connected to it an inclined plate 2 at a selected angle *p* therebetween. Upon the inclined support plate 2 is mounted an axle A which rotatably supports thereon a hourly graduated arcuate plate 4. The hour graduations XII, I, II, III, IV, and VI on the left side of plate 4 represent time in the afternoon hours and similar hourly graduations on the right side of the plate 4 represents time in the morning hours. A rectangular style plate 5 is mounted to the inclined plate 2 at a selective angle *q* relative to the inclined plate 2. For mechanical regidity, style plate 5 is shown supported on inclined plate 2 with struts 6, 6*a*, passing through apertures 7, 7*a* in the arcuate plate 4. The left edge 5*a* of the style plate 5 when pointed towards the celestial pole casts a shadow to indicate time on the left hourly graduations on the arcuate plate 4. The right edge 5*b* of the style plate 5 is parallel to the left hand edge 5*a* and when pointing at the celestial pole casts a time shadow on the right hand hourly graduations on the arcuate plate 4. The base plate 1 is tiltable by means of thumb screws 8, 8*a* threaded into base plate 1 so that the style plate 5 can be selectively tilted relative to the earth's horizontal plane. The angle of the tilt of plate 5 is measured on a scale 9 disposed upon inclined plate 2 which is graduated in latitude. With the aid of thumb screws 8, 8*a*, the angle of the style plate 5 relative to the earth's horizon is adjusted to the latitude of the site of my device. Juxtapositioned to the scale 9 is a slot 10 in the inclined plate 2. A weighted string or plum bob 11 is fixed to an edge 5*c* of the style plate 5 so that the string passes through slot 10 and its vertical position is readable upon latitude scale 9. An aperture 12 in the arcuate plate 4 permits rotation of plate 4 upon axle A without interfering with the gravity oriented position of the string 11. A scale 13 is disposed upon arcuate plate 4 to correct for the equation of time, as explained later, caused by the daily aggle of declination of the sun as it varies throughout the year. A scale 14 juxtapositioned to scale 13 is disposed upon inclined plate 2 and is graduated in longitude. Arcuate plate 4 is selectively positioned about axle A and is fixed in such selective position by conventional means not shown. A magnetic compass 15 is optional in the event, after accurately determining the direction of true north with my inventive device, it becomes necessary to measure the deviation of the earth's magnetic field.

In Tokyo, where the latitude is 35° north, it is convenient to make angle *q* (between the style plate 5 and the inclined plate 2) equal to 45° and to make angle *p* equal to 10° so that the angle of the style plate 5 is 35° as adjusted by screws 8, 8*a* and as read by string 11 on the scale 9. In Tokyo, where the longitude is 140°, such marking on scale 14 should be placed opposite the equation of time correction on scale 13. The correction for equation of time is caused by the varying declination of the sun throughout the year and such corrections in minutes are shown in FIG. 3.

To make may device nost suitable for portable general use any place in the world, the inclined plate 2 can be hinged to the base plate 1, the struts 6, 6*a*, can be hinged to the style plate 5 and the style plate 5 can be hinged to the inclined plate 2.

FIG. 2 shows how the hourly markings on the arcuate plate 4 are determined so that the angular displacement between adjacent hours remain substantially uniform throughout all hours of the morning and afternoon.

In a convention sundial, the distances between the hour marks XII, I, II, III, IV, V, VI, etc. are not equidistant. It has been known that the hour graduation angle *a* can be calculated from the following formula:

$$\tan a_i = \sin s \tan t_i (1)$$

where $s$ = latitude $t_i$ = the sun's hour angle

Assuming the latitude of 45° for Tokyo

TABLE 1

| | Angle Between Adjacent Hour Numbers |
|---|---|
| $a_{12}$ = 0°0′ | |
| $a_1$ = 10°43.7′ | 10°43.7′ |

TABLE 1-continued

| | Angle Between Adjacent Hour Numbers |
|---|---|
| $a_2 = 22°12.5'$ | 11°28.8' |
| $a_3 = 35°15.9'$ | 13°3.4' |
| $a_4 = 50°46.1'$ | 15°30.2' |
| $a_5 = 69°14.8'$ | 18°28.7' |
| $a_6 = 90°0'$ | 20°45.2' |

From Table 1 it is clear that in a conventional sundial the distance between the hour marks V and VI is about twice the distance between the marks I and II.

In FIG. 2, there is shown a method of making the hour marks substantially equidistant. As contemplated by the inventor, the hour marks M, C, D, E, F, H and L should have nearly equal intervals.

As shown in FIG. 2, line VIOB is drawn from point VI to a point B through O and line BAR is drawn perpendicular to VIOB from B. Arc L Mis drawn with radius $l$ and center pivot at A. The arc LM cuts the hour lines O-VI, O-V, O-IV, O-III, O-II, O-I and O-XII at L, H, F, E, D, C, and M respectively. Now, $$\angle RAM = \phi_{12},\ \angle RAC = \phi_1,\ \angle RAD = \phi_2 \ldots \angle RAE = \phi_3$$

and and $\phi_i$ is generic and indicates the hour.

FIG. 2 shows the relation between $a_3$ and $\phi_3$. When a line is drawn perpendicular to OE, the 3 o'clock line, at J from the center A, then $$AO = m,\ \angle AOB = \beta$$

$$AM = AC = AD = AE \ldots = l,$$

Radius of the arc $$\angle MOC = a_1,\ \angle MOD = a_2,\ \angle MOE = a_3 \ldots$$

$$\angle RAM = \phi_{12},\ \angle RAC = \phi_1,\ \angle RAD = \phi_2,\ \angle RAE = \phi_3 \ldots$$

Then $$m \cos (a_3 - \beta) = l \sin (\phi_3 - a_3) = AJ$$

In general $$m \cos (a_i - \beta) = l \sin (\phi_i - a_i) \quad (2)$$

By the trial and error method, from Formulas 1 and 2, values were computed which have nearly arithmetically progressive values.

When $OB = 8.00$cm., $BA = 4.00$cm., $l = 17.89$cm., $\phi_i$ has nearly equal differences as in Table 2.

TABLE 2

| | Angle Between Adjacent Hour Numbers |
|---|---|
| $\phi = 26°33.9'$ | |
| $\phi = 39°28.8'$ | 12°54.9' |
| $\phi$ 52°6.8' | 12°38.0' |
| $\phi = 64°53.1'$ | 12°46.3' |
| $\phi = 77°54.0'$ | 13°0.9' |
| $\phi = 90°48.7'$ | 12°54.7' |
| $\phi = 102°55.3'$ | 12°6.6' |

Except for the VI hour number when $\phi = 102°\ 55.3'$, the average for the angle between the other adjacent hour number is 12°5.5'.

It is known from Table 2 that the average difference for 1 hour is 12°51' between 12 and 5 o'clock in the afternoon and that the difference is 13' at the maximum. The ratio between this value and the average is 1.7% (13'/12°51'). Therefore, if Points M, C, D, E, F . . . are adopted as the time marks that show 12, 1, 2, 3, . . . o'clock, respectively, the distance between two neighboring scale points is almost equal.

The scale lines between 6 and 12 o'clock in the morning are drawn as points of symmetry with respect to line BR in FIG. 2.

According to the invention the sundial shown in FIG. 1, is constructed as follows:

Style plate 5 is fixed to a dial plate 4 at an angle of 45°.

The scales on the dial plate 4' were determined as describes above.

Referring back now to FIG. 1, the hour marks XII, I, II, III, IV, V, VI, etc. are positioned according to FIG. 2 and Table 2. Style plate 5 is fixed at an angle of 45° with inclined plate 2. The parallel sides $5_a$ and $5_b$ of the style plate 5 passes through 0 and 0', respectively. In FIG. 2, 0'B is symmetrical with BO in respect of BR. Also the scale points for 6 o'clock in the morning and in the afternoon are present on the extension of 00'. The sides $5_a$ and $5_b$ of the style plate become parallel to the axis of the earth when the dial plate is adjusted by thumb screws 8, 8 to angle of (45° − $p$) ($p$ should equal about 10° in Tokyo) with respect to the horizontal plane, the south end of the dial plate being placed higher than the north end. The weight string 11 should read 35° latitude on scale 9.

In FIG. 1, a line along the edge $5_d$ of the style plate 5 is extended equal distances in both directions from the mid points B of $5_d$ to points 0 and 0' and, thereafter, beyond to terminate at the two hour marking VI and VI. A circle of radius $l$ from A is drawn passing through the both ends of the such straight line for the locus of the hourly graduations according to FIG. 2 and Table 2.

Accordingly, the time shown by the position of the sun shadow of the edges **5*a* and 5*b* of the style plate 5 indicates true solar time. The difference between the standard time and the true solar time is due in the longitude difference and the equation of time at the site. However, the difference from the standard time is easily corrected on the dial plates 13 and 14**.

For the determination of the true north direction in daytime, for example, on a ship on the ocean, it is usually necessary to perform complex calculations on the data obtained by astronomical observation, if magnetic needless, gyrocompasses, and radio navigators are not available.

The meridian indicator of the present invention, which makes use of the principle of the sundial, directly indicates the direction without any complex calculations. The meridian indicator makes use of the shadow of a style plate projected on a dial plate, which is equipped with equidistant scales. This method of precise direction determination is epoch-making in the history of astronomical observation.

The determination of the meridian with a magnetic needle is always accompanied by an error of 5°— 10°. According to the method of the present invention, as is clearly observed in Table 2, the angular distance of scale marks corresponding to 1 hour is about 12°51'. Therefore, the distance corresponding to 1 minute is about 13'. When the width of the style plate is 16 cm, it is easy to read out the time from the shadow of the style plate on the dial plate, with an error of less than 1 minute.

According to the results of experiment, about 0.5° error appears in the determination of direction when the error of times on the meridian indicator is 1 minute. Therefore, it is not difficult to determine the direction with an error less than 0.5° if the determination is made with normal care.

After determining true north with my sun dial of FIG. 1 it is also possible to measure the deviation of the earth magnetism.

The sundial of FIG. 1 when correctly placed indicates correct time when the celestial pole direction is known. Conversily, the same sundial can be used as a meridian indicator when the true solar time is correctly known, provided the sun is shining in the sky.

While there has been described and pointed out the fundamental novel features of the invention as applied to a preferred embodiment, it will be understood that various omissions and substitutes and changes in the form and details of the devices illustrated and their operation may be made by those skilled in the art, without departing from the spirit of the invention. It is the intention, therefore, to be limited only as indicated by the scope of the following claims.

We claim:

1. A meridian indicator comprising a base plate, an inclined plate disposed at a selected angle to said base plate, an hourly graduated arcuate plate, means rotatively supporting said arcuate plate upon said inclined plate, a rectangular style plate, means supporting a first edge of said style plate at a selected angle to the inclined plate, adjustable means for angularly positioning said style plate at a selected angle relative to a horizontal plane, a weighted string means attached to a second edge of said style plate which is perpendicular to said first edge, apertures in the inclined plate and the arcuate plate positioned so that said weighted string means ajustably passes therethrough, and a latitude scale means disposed on said inclined plate and juxtapositioned to said weighted string means as it passes through said apertures, and equation of time correction scale means disposed upon said arcuate plate, and a longitude scale means disposed upon said inclined plate in juxtaposition to said equation of time correction scale means, said arcuate plate having hourly graduations so that when said first edge of said style plate is pointing to true north, the shadow cast by either the sun of said first edge or a third edge parallel to said first edge of said style plate falls correctly upon an hourly graduation upon said arcuate plate to read true solar time.

* * * * *